United States Patent
Brown et al.

(10) Patent No.: US 6,189,513 B1
(45) Date of Patent: Feb. 20, 2001

(54) FUEL TRANSFER AND CONDITIONING UNIT FOR AUTOMOTIVE VEHICLE

(75) Inventors: Bradley Allen Brown, Leonard, MI (US); Carlos Armesto, Robbinsville, NJ (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/324,590

(22) Filed: Jun. 3, 1999

(51) Int. Cl.⁷ .................................................. F02M 37/04
(52) U.S. Cl. ....................... 123/497; 123/198 C; 210/234
(58) Field of Search .................................. 123/497, 509, 123/510, 198 C; 210/234, 430, 438, 454; 137/447, 498

(56) References Cited

U.S. PATENT DOCUMENTS

| | | | |
|---|---|---|---|
| 2,803,384 | 8/1957 | Korte et al. | 222/333 |
| 2,937,755 | 5/1960 | Szwargulski | 210/172 |
| 3,239,064 | 3/1966 | White | 210/436 |
| 3,254,769 | 6/1966 | McArthur | 210/194 |
| 3,294,025 | 12/1966 | Niemeyer et al. | 210/181 |
| 3,294,240 | 12/1966 | Korte | 210/181 |
| 3,550,776 | 12/1970 | Hamilton | 210/94 |
| 4,608,161 | 8/1986 | Niemeier . | |
| 4,617,116 | 10/1986 | Seiler | 210/137 |
| 4,624,779 | 11/1986 | Hurner | 210/180 |
| 4,637,355 | 1/1987 | Odashima | 123/73 AD |
| 4,641,617 | 2/1987 | Aoyama et al. | 123/262 |
| 4,836,923 | 6/1989 | Popoff et al. | 210/232 |
| 4,920,937 | 5/1990 | Sasaki et al. | 123/305 |
| 4,955,339 | 9/1990 | Sasaki et al. | 123/295 |
| 4,958,604 | 9/1990 | Hashimoto | 123/276 |
| 4,974,565 | 12/1990 | Hashimoto et al. | 123/299 |
| 5,024,184 | 6/1991 | Nagano et al. | 123/48 R |
| 5,036,822 | 8/1991 | Kojima | 123/509 |
| 5,058,549 | 10/1991 | Hashimoto et al. | 123/298 |
| 5,109,816 | 5/1992 | Sasaki | 123/263 |
| 5,115,774 | 5/1992 | Nomura et al. | 123/276 |
| 5,115,776 | 5/1992 | Ohno et al. | 123/299 |
| 5,127,378 | 7/1992 | Ito | 123/300 |
| 5,127,379 | 7/1992 | Kobayashi et al. | 123/302 |
| 5,170,759 | 12/1992 | Ito | 123/276 |
| 5,176,122 | 1/1993 | Ito | 123/478 |
| 5,215,053 | 6/1993 | Ito | 123/276 |
| 5,233,956 | 8/1993 | Ueda et al. | 123/302 |
| 5,245,975 | 9/1993 | Ito | 123/520 |
| 5,259,348 | 11/1993 | Kobayashi et al. | 123/260 |
| 5,291,865 | 3/1994 | Sasaki | 123/298 |
| 5,307,770 | 5/1994 | Davis et al. | 123/179.11 |
| 5,357,925 | 10/1994 | Sasaki | 123/298 |
| 5,392,750 | 2/1995 | Laue et al. | 123/509 |
| 5,438,967 | 8/1995 | Ito | 123/339.12 |
| 5,505,173 | 4/1996 | Sasaki et al. | 123/276 |
| 5,553,588 | 9/1996 | Gono et al. | 123/276 |
| 5,578,221 | 11/1996 | Janik | 210/767 |
| 5,647,330 | 7/1997 | Sawert et al. | 123/509 |
| 5,699,773 | 12/1997 | Kleppner et al. | 123/509 |
| 5,770,065 | 6/1998 | Popoff et al. | 210/232 |

FOREIGN PATENT DOCUMENTS

| | | |
|---|---|---|
| 937 529 | 9/1963 | (GB) . |
| 1 516 182 | 6/1978 | (GB) . |

*Primary Examiner*—Henry C. Yuen
*Assistant Examiner*—Mahmoud M Gimie
(74) *Attorney, Agent, or Firm*—Jerome R. Drouillard

(57) ABSTRACT

A fuel transfer and conditioning unit for an automotive vehicle includes a reservoir with a generally cylindrical filter element and a pump module contained within the reservoir and extending within the filter element. A combination valve prevents forward flow of fuel through the pump module unless the filter element is installed within the reservoir and also prevents reverse flow of fuel from the engine in the event the filter element is removed for maintenance.

7 Claims, 4 Drawing Sheets

FUEL TRANSFER AND CONDITIONING UNIT FOR AUTOMOTIVE VEHICLE

BACKGROUND OF THE INVENTION

1. Field of the Invention

The present invention relates to fuel conditioning for the purpose of supplying fuel to an internal combustion engine.

2. Background Information

Combination fuel pump and filter units which are mounted remotely from a vehicle fuel tank are known in the art. U.S. Pat. No. 5,036,822 discloses such a unit intended for use in a watercraft. A problem with the unit disclosed in the '822 patent resides in the fact that if the filter element is removed, the unit may nevertheless be used to transfer fuel, giving rise to the possibility of contaminating the fuel system downstream of the pump with impurities which are drawn and passed through the transfer pump in the absence of a filter. A fuel transfer and conditioning unit according to the present invention solves this problem by preventing the transfer of fuel if the filter is not installed in the unit.

SUMMARY OF THE INVENTION

A fuel transfer and conditioning unit for supplying liquid fuel to an internal combustion engine of an automotive vehicle includes a reservoir for receiving fuel from a tank, with the reservoir having a tank supply port, and engine supply port, an engine return port, and a tank return port. A generally cylindrical filter element is located within the reservoir. This element filters fuel flowing through the transfer and conditioning unit from the tank supply port and out through the engine supply port. A pump module located in a cavity extending within the filter element is adapted to move fuel from the tank supply port to the engine supply port. A combination valve operatively associated with the pump module prevents fuel from flowing through the pump module unless the filter element is installed within the reservoir.

As used herein, the term "tank supply port" means a connection which allows fuel to enter the fuel transfer and conditioning unit. The term "engine supply port" means the port or connection through which fuel flows to an engine. The term "engine return port" means the port or connection for receiving fuel flowing back from an engine. Finally, the term "tank return port" means a connection or port through which fuel flows from the fuel transfer and conditioning unit to the fuel tank.

According to another aspect of the present invention, a fuel transfer and conditioning unit further includes a fuel heater housed within the reservoir for warming fuel flowing through the fuel transfer and conditioning unit. A unit according to the present invention may further include a fuel pressure regulator interposed between the pump module and the engine supply port for controlling the pressure of fuel supplied to an engine.

A combination valve not only prevents fuel from flowing through the pump module unless a filter element is installed within the reservoir, but also prevents reverse flow of fuel from the engine through the engine supply port in the event that the filter element has been removed.

Another aspect of the present invention involves a thermally responsive valve which may be interposed between the engine return port and the tank return port for allowing fuel flowing from an engine to reenter the reservoir in the event that the temperature of fuel flowing from the engine is less than a predetermined threshold value.

It is an advantage of the present invention that a fuel transfer and conditioning unit according to the present invention not only provides filtering, recirculating, and thermal heating of fuel, but also prevents operation of the vehicle engine in the event that the filter cartridge is not installed. This is a decided advantage because in the past motorists facing engine stalling due to plugged cartridges would sometimes remove the cartridge, thereby allowing contaminant laden fuel to flow to the engine with the result that the fuel pump and/or injectors were damaged.

Other advantages as well as objects and features of the present invention will become apparent to the reader of this specification.

DETAILED DESCRIPTION OF PREFERRED EMBODIMENT(S)

Figure 1:
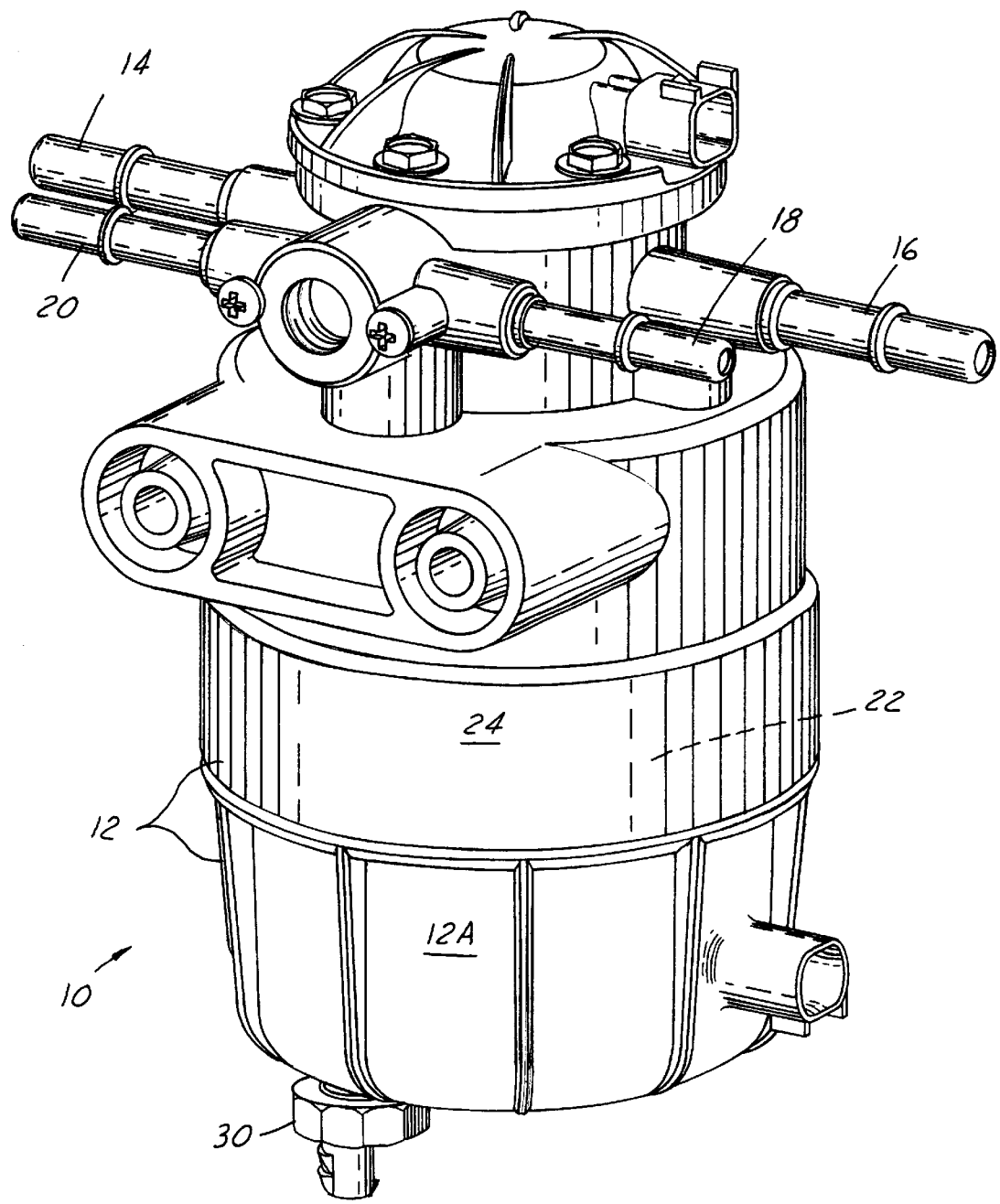
FIG. 1 is a perspective view of a fuel transfer and conditioning unit according to the present invention.

As shown in FIG. 1, fuel transfer and conditioning unit 10 has reservoir 12 consisting of a lower bowl 12A with the upper part of the reservoir being formed in housing 24. As explained above, fuel enters unit 10 through tank supply 14 and flows to the engine via engine supply port 16. Fuel returns from the engine (not shown) through engine return port 18 and flows from unit 10 via fuel tank return port 20. Drain 30 allows any water which has accumulated within reservoir 12 to be eliminated.

Figure 2:
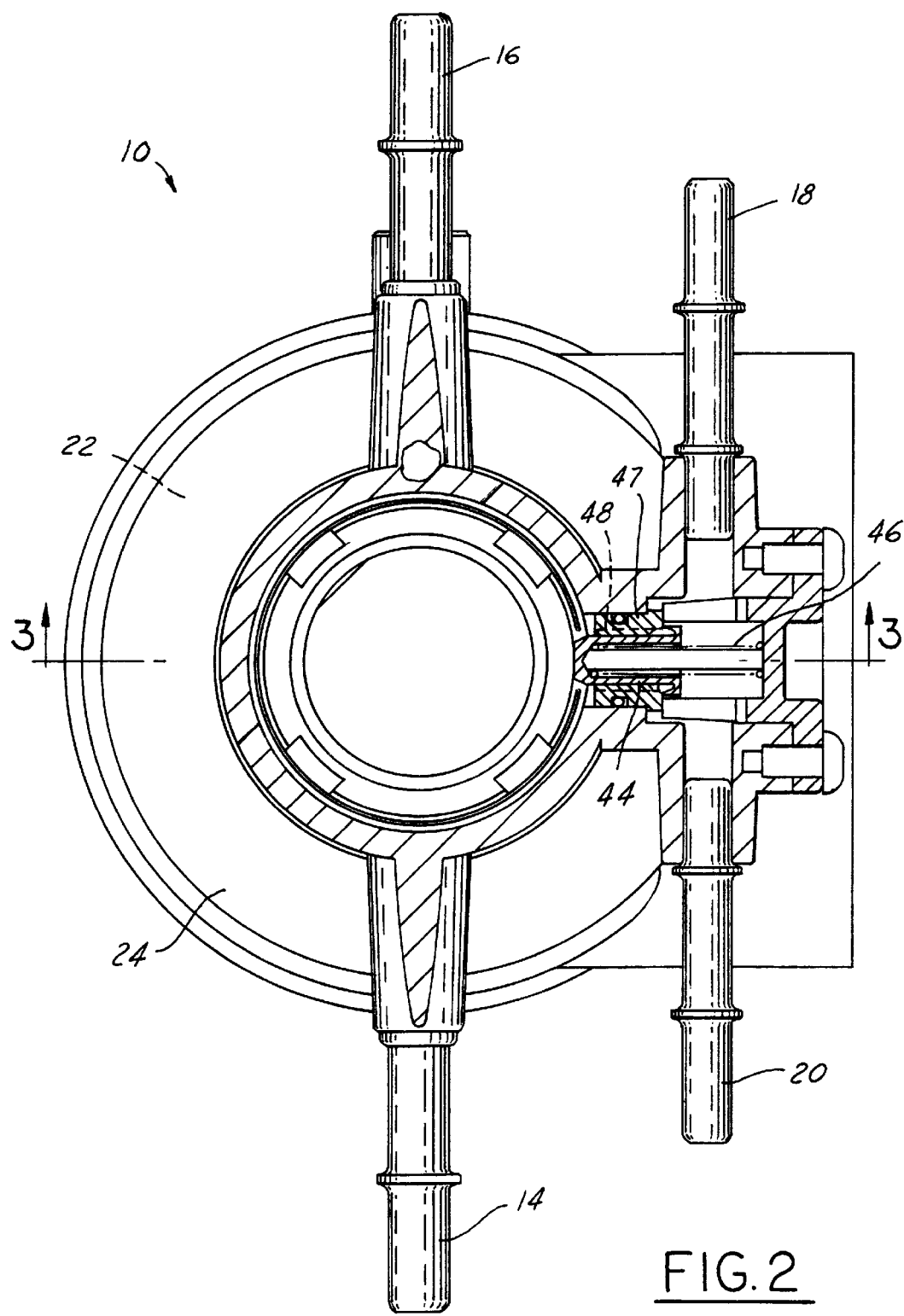
FIG. 2 is a plan view of the unit shown in FIG. 1.
Figure 3:
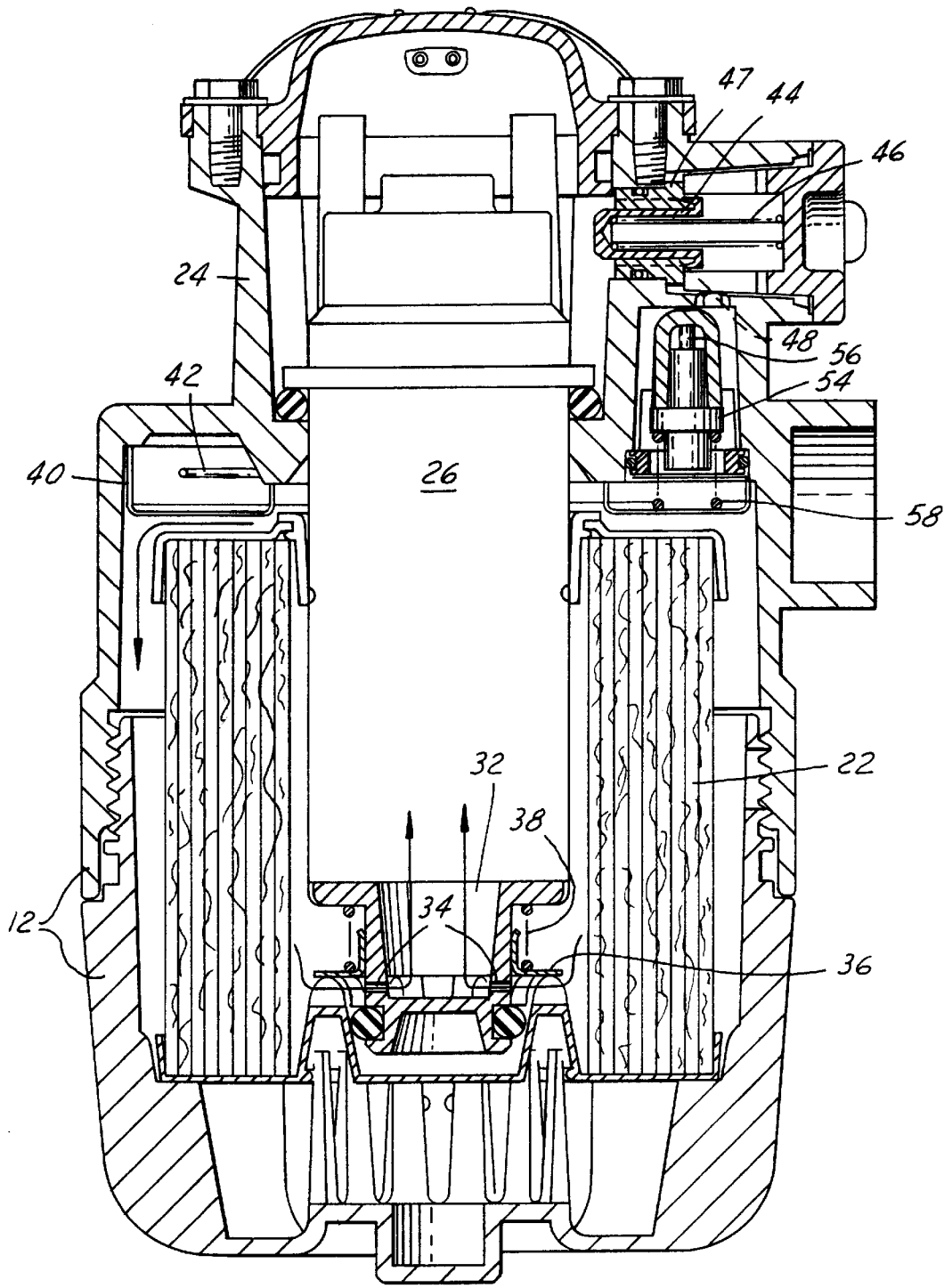
FIG. 3 is a sectional view of the unit of FIGS. 1 and 2 taken along the line 3—3 of FIG. 2.

FIGS. 2 and 3 illustrate with particularity the pressure control function of the present unit. The purpose of the pressure control function is to limit the pressure of the fuel supplied to an engine. This function is achieved by means of fuel pressure control plunger 44 which is mounted within valve body 47. As shown in FIG. 3, fuel flowing through electric pump 26 or, for that matter, through the hand pump shown in FIG. 4, flows from the interior of unit 10 through a series of axial passages 48 formed in valve body 47 whereupon fuel flows past lip seal 44A of plunger 44. Lip seal 44A is maintained in contact with valve body 47 by means of spring 46, thereby setting the pressure at which fuel flows past fuel pressure control plunger 44.

Fuel entering unit 10 first passes through port 14 and then into the tray 40 which is formed in the upper part of housing 24. Wire heater 42 is also contained in tray 40. After fuel spills out of tray 40, it flows on the outer periphery of filter element 22 and then flows radially inwardly from the outer diameter of filter element 22 to the inner cavity of filter 22, whereupon the fuel falls down to the level at the bottom of pump 26 and passes into pump 26 through a plurality of ports 34. Thereafter, fuel flows upwardly through pump inlet 32 and is discharged at the top of pump 26 and allowed to flow out.

Fuel entering port 18, in other words, returning from an engine, flows past spring 46 and then downwardly past thermal valve poppet 54 and then into tray 40. Thermal valve poppet 54 is of the normally open type by virtue of the fact that spring 58 keeps annular area 60 of poppet 54 away from contact with seat 62 under normal operation, unless the temperature of the fuel has reached a predetermined threshold whereupon plunger 56 extends from poppet 54 so as push poppet 54 onto seat 62 and thereby cause fuel to flow from port 20 to the fuel tank. Poppet 54 may be of the wax pellet conventional type which is commonly used in such devices as automotive thermostats. However, those skilled in the art realize that other types of thermally responsive or pressure responsive elements may be used in a unit of the present type.

FIG. 3 illustrates an important part of the present invention in the form of sliding valve element 36 which is spring loaded by spring 38 in a downward direction. The function of sliding valve element 36 is to cover ports 34 in the event that an operator attempts to use the present unit without the filter element 22 being present. It may be noticed from FIG. 3 that filter element 22 includes an integral plurality of abutments 23 which physically engage sliding valve element 36 so as to push sliding valve element 36 away from ports 34 against the tension of spring 38. In this fashion, sliding valve element 36, which is a combination valve, prevents forward flow through the pump module 26 unless filter element 22 is installed within reservoir 12.

Another issue with devices of the present type, particularly when employed with fuel injected engines, such as diesel engines and high pressure direct injection gasoline engines, is a problem of air entrainment in the fuel system. Frequently, when filters are changed in diesel engines, it is exceedingly difficult to restart the engine because fuel is lost or allowed to drain from the fuel system downstream from the filter, with the result that air becomes entrained and lodged in a very difficult position to remove from the engine fuel system.

Figure 4:
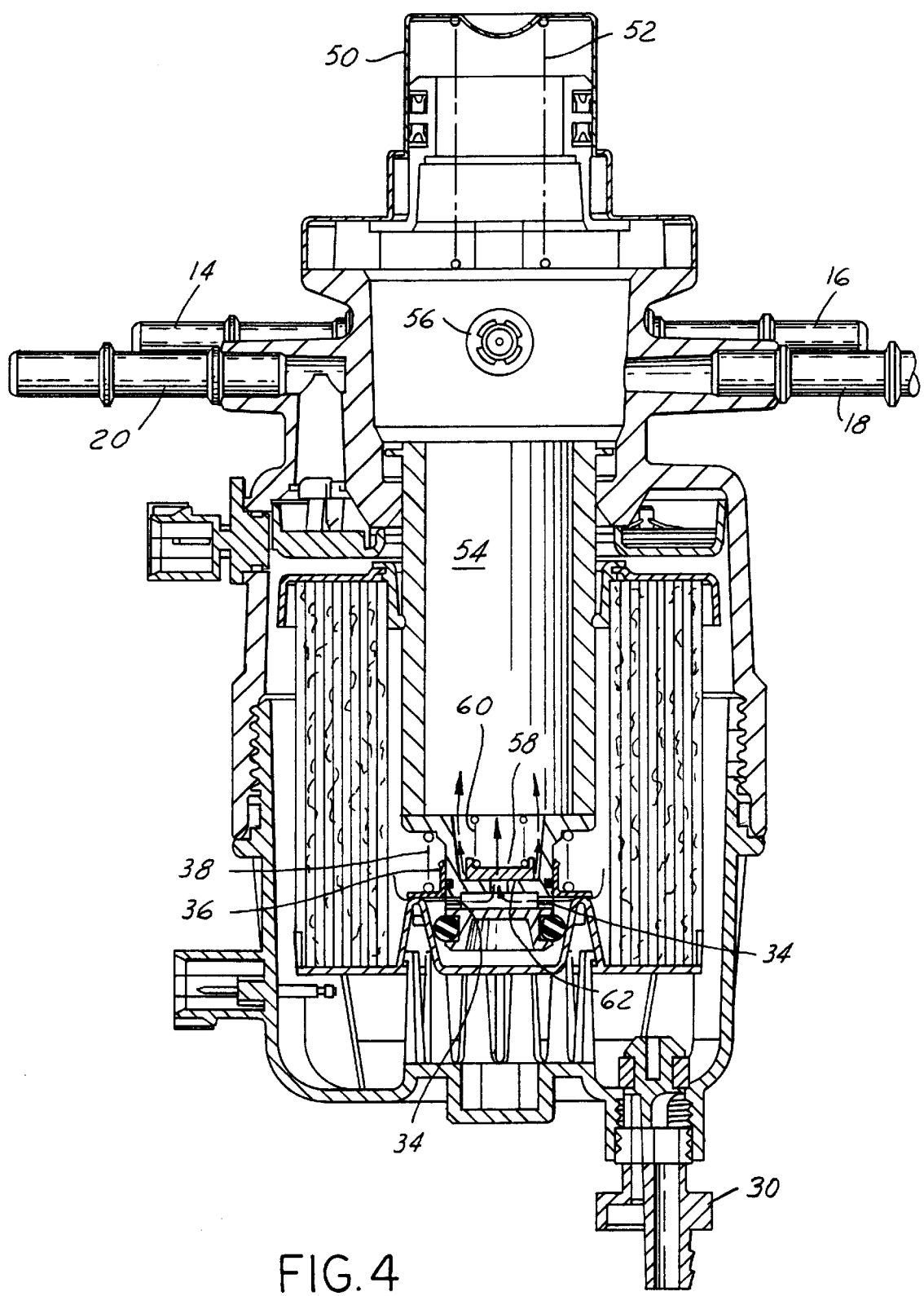
FIG. 4 is a sectional view similar to FIG. 3, but including a manually operable pump in lieu of the electrically driven pump illustrated in FIG. 3.

In the present case, the combination valve, including sliding valve element 36, prevents the loss of fuel from a portion of the fuel system including pump 26 when filter element 22 is removed from unit 10. Moreover, this is true even if, as shown in FIG. 4, a hand pump is used in lieu of electric pump 26. In either event, removal of the filter element will not result in the loss of fuel from a downstream portion, i.e., that portion of the fuel system from the unit 10 to the engine. As a result, the engine startability will be greatly improved.

FIG. 4 illustrates a device according to the present invention and having a manually actuatable pump instead of an electrically driven pump. Cap 50 may be manually gripped and pushed down, against the force of return spring 52, to force fuel from cavity 54 and through check 56 out through port 16. When cap 50 is released, fuel is pulled through ports 34 and past valve disc 58, which is pushed onto seat 62 by spring 60.

While the invention has been shown and described in its preferred embodiments, it will be clear to those skilled in the arts to which it pertains that many changes and modifications may be made thereto without departing from the scope of the invention.

What is claimed is:

1. A fuel transfer and conditioning unit for supplying liquid fuel to an internal combustion engine of an automotive vehicle, comprising:

a reservoir for receiving fuel from a tank, with the reservoir having a tank supply port, an engine supply port, an engine return port and a tank return port;

a generally cylindrical filter element located within the reservoir, for filtering fuel flowing through the transfer and conditioning unit from the tank supply port and through the engine supply port;

a pump module located in a cavity extending within the filter element, with the pump module being adapted to move fuel from the tank supply port to the engine supply port;

a combination valve operatively associated with the pump module, with the combination valve preventing fuel from flowing through the pump module unless said filter element is installed within the reservoir; and a thermally responsive valve interposed between the engine return port and the tank return port for allowing fuel flowing from the engine to re-enter the reservoir in the event that the temperature of fuel flowing from the engine is less than a predetermined threshold value.

2. A fuel transfer and conditioning unit according to claim 1, further comprising a fuel heater housed within said reservoir for warming fuel flowing through the fuel transfer and conditioning unit.

3. A fuel transfer and conditioning unit according to claim 1, further comprising a fuel pressure regulator interposed between the pump module and the engine supply port, for controlling the pressure of fuel supplied to an engine.

4. A fuel transfer and conditioning unit according to claim 1, wherein said combination valve not only prevents fuel from flowing through the pump module unless said filter element is installed within the reservoir, but also prevents reverse flow of fuel from the engine through the engine supply port in the event that the filter element is removed.

5. A fuel transfer and conditioning unit according to claim 1, wherein said pump module comprises a pump driven by a motor.

6. A fuel transfer and conditioning unit according to claim 5, wherein said pump module comprises a pump driven by an electric motor.

7. A fuel transfer and conditioning unit according to claim 1, wherein said pump module comprises a manually actuatable pump.

\* \* \* \* \*